(12) United States Patent
Eberle et al.

(10) Patent No.: US 9,742,679 B2
(45) Date of Patent: Aug. 22, 2017

(54) RATE LIMITER FOR A MESSAGE GATEWAY

(71) Applicant: Oracle International Corporation, Redwood City, CA (US)

(72) Inventors: Hans Eberle, Mountain View, CA (US); Hagen W. Peters, Sunnyvale, CA (US); Nils Gura, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 290 days.

(21) Appl. No.: 14/710,220

(22) Filed: May 12, 2015

(65) Prior Publication Data

US 2016/0337252 A1    Nov. 17, 2016

(51) Int. Cl.
*H04L 12/815* (2013.01)
*H04L 12/841* (2013.01)
*H04L 12/801* (2013.01)
*H04L 12/861* (2013.01)

(52) U.S. Cl.
CPC .............. *H04L 47/22* (2013.01); *H04L 47/28* (2013.01); *H04L 47/29* (2013.01); *H04L 49/9031* (2013.01)

(58) Field of Classification Search
None
See application file for complete search history.

(56) References Cited

U.S. PATENT DOCUMENTS

| | | | |
|---|---|---|---|
| 7,688,727 B1 * | 3/2010 | Ferguson | H04L 49/3009 370/230.1 |
| 2013/0007823 A1 * | 1/2013 | Mangs | H04L 1/0061 725/109 |

* cited by examiner

*Primary Examiner* — Sulaiman Nooristany
(74) *Attorney, Agent, or Firm* — Park, Vaughan, Fleming & Dowler LLP

(57) ABSTRACT

A hardware-implemented rate limiter is described. This implementation guarantees that messages containing a value v are not forwarded at a higher rate than a predefined threshold value r. More specifically, given a number of times x in a time interval y, which specifies a rate r defined by x/y, the rate limiter reports a violation by selectively setting an error value when v occurs more than x times during the time interval y. Moreover, the rate limiter may be able to keep track of multiple predefined threshold values for different rates. Furthermore, the rate limiter may keep track of $2^b$ different values v, where b is the number of digits of the binary representation of v.

18 Claims, 9 Drawing Sheets

RATE LIMITER FOR A MESSAGE GATEWAY

BACKGROUND

Field

The present disclosure relates to a rate limiter for use in constraining the rates of different messages processed by a message gateway.

Related Art

A message gateway can be used to validate incoming messages before they are forwarded. However, in some applications the rates of different messages (such as different types of messages) may need to be constrained.

In particular, in a message gateway used to process messages with instructions from brokers and dealers for stock transactions or trades on a stock exchange, regulatory requirements sometimes mandate that the number of trades for a given stock should be bounded as a function of time. However, the message gateway may need to process, on average, a very large number of messages per second, and any delay in the processing may have negative consequences. For example, if the latency is too large, the stock price may change before a trade can be conducted. Consequently, the latency associated with processing a given message may need to be very short, e.g., on the order of microseconds. It may be difficult to achieve this design target while at the same time bounding the rates of the messages for thousands of different stocks.

Hence, what is needed is a rate limiter and/or a message gateway without the above-described problems.

SUMMARY

One embodiment of the present disclosure relates to the design of a rate limiter. This rate limiter includes: an input node that receives input values; a history memory, coupled to the input node, which stores the input values during a time window defined by a current time and a predefined time interval; a counter memory, coupled to the input node and the history memory, which aggregates counter values for different values of the input values during the time window; and control logic coupled to the counter memory. This control logic: compares a counter value to a predefined threshold value; and selectively sets an error value based on the comparison.

The history memory may include a ring buffer. This ring buffer includes an in-pointer that points to a storage element at a head of the ring buffer where a next-received input value is stored with an associated timestamp. Furthermore, the ring buffer includes an out-pointer that points to another storage element at a tail of the ring buffer where another input value and another associated timestamp are stored and are removed when the other timestamp moves out of the time window. Note that the counter memory may include array elements associated with the different values. An array element for a given value may be incremented when the next-received input value having the given value is stored in the history memory and may be decremented when the other input value having the given value is removed from the history memory. In some embodiments, when the other timestamp moves out of the time window, the other input value and the other timestamp are removed from the history memory by incrementing the out-pointer.

Moreover, the ring buffer may include a second out-pointer. This second out-pointer may point to a second storage element in the ring buffer where the other input value and the other associated timestamp are stored and are removed when the other timestamp moves out of a second time window, which is defined by the current time and a second predefined time interval. In some embodiments, when the other timestamp moves out of the second time window, the other input value and the other timestamp are removed from the history memory by incrementing the second out-pointer.

Furthermore, the error value may be provided when the counter value exceeds the predefined threshold value.

Additionally, when the error value is set, a most-recent instance of a value of the input value corresponding to the counter value may be excluded from the history memory. Alternatively, when the error value is set, a most-recent instance of a value of the input value corresponding to the counter value may be stored in the history memory.

In some embodiments, the control logic: compares a second counter value to a second predefined threshold value; and selectively sets a second error value based on the comparison of the second counter value and the second predefined threshold value. The second counter value may be aggregated during a second time window defined by the current time and a second predefined time interval.

The control logic may be coupled to the history memory. Moreover, the control logic may apply a predefined hash function to the input values prior to storing hashed input values in the history memory, and the counter memory may aggregate the hashed input values in the counter values. Furthermore, the control logic may apply a mapping function to the input values prior to storing mapping input values in the history memory, and the counter memory may aggregate the combination of the hashed input values and the mapping input values in the counter values.

Another embodiment provides a system (such as a message gateway) including: a processor; and the rate limiter coupled to the processor.

Another embodiment provides a method for selectively setting an error value, which may be performed by the rate limiter. During the method, the rate limiter receives the input values at the input node. Then, using the history memory in the rate limiter, the rate limiter stores the input values during the time window defined by the current time and the predefined time interval. Moreover, using the counter memory in the rate limiter, the rate limiter aggregates the counter values for the different values of the input values during the time window. Next, using the control logic in the rate limiter, the rate limiter compares the counter value to the predefined threshold value. Furthermore, using the control logic in the rate limiter, the rate limiter selectively sets the error value based on the comparison.

The preceding summary is provided as an overview of some exemplary embodiments and to offer a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

Figure 1:
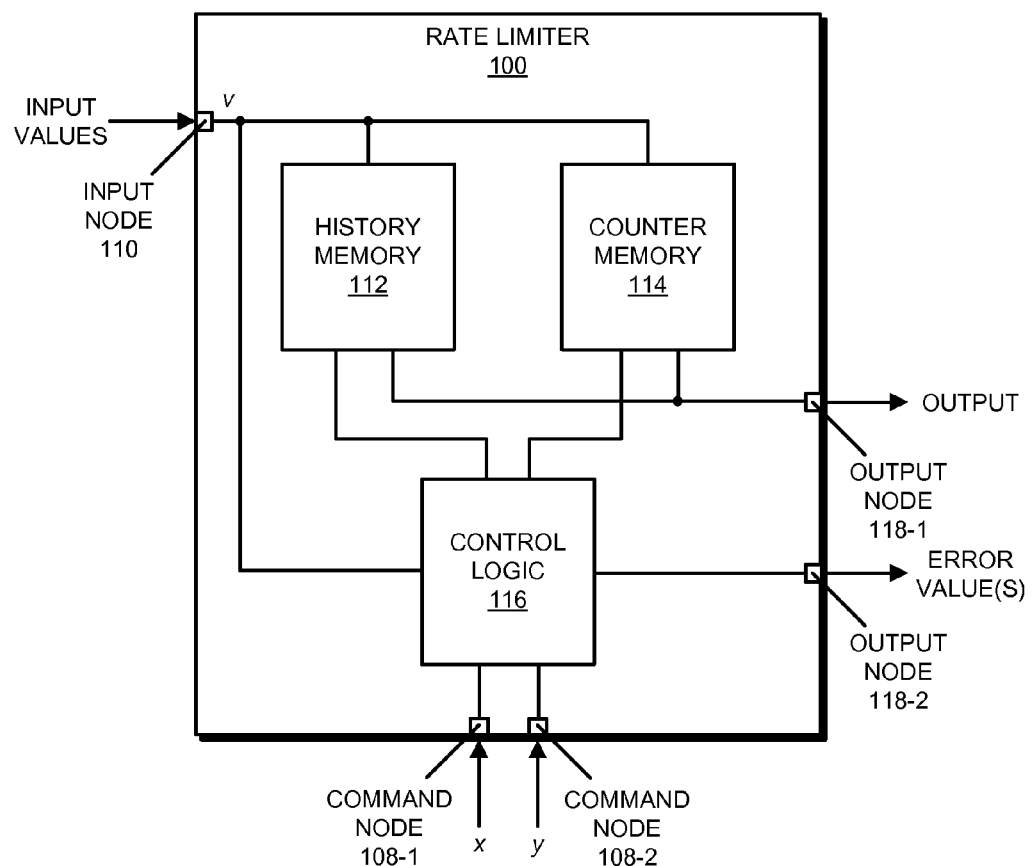
FIG. 1 is a block diagram illustrating a rate limiter in accordance with an embodiment of the present disclosure.

Table 1 provides counter values aggregated during operation of the rate limiter of FIG. 1 in accordance with an embodiment of the present disclosure.

Table 2 provides pseudocode for a single-rate rate limiter in accordance with an embodiment of the present disclosure.

Table 3 provides pseudocode for a multiple-rate rate limiter in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a rate limiter, a system that includes the rate limiter (such as a message gateway), and a method for selectively setting an error value are described. A hardware implementation of the rate limiter guarantees that messages containing a value v are not forwarded at a higher rate than a predefined threshold value r. More specifically, given a number of times x in a time interval y, which specifies a rate r defined by x/y, the rate limiter reports a violation by selectively setting an error value when v occurs more than x times during the time interval y. Moreover, the rate limiter may be able to keep track of multiple predefined threshold values for different rates. For example, the rate limiter may keep track of $2^b$ different values v, where b is the number of digits of the binary representation of v.

The rate limiter may allow a message gateway to constrain or bound the number of instances of the values in different messages in the same or different time intervals with low latency (such as latencies on the order of a microsecond). This may allow the rate limiter to ensure regulatory compliance in latency-sensitive applications, such as stock trading.

We now describe embodiments of the rate limiter. FIG. 1 presents a block diagram illustrating a rate limiter 100. This rate limiter may include an input node 110 that receives input values v (or symbols). For example, the input values (or symbols) may be included in payloads or fields in messages. In some embodiments, the input values are not included in headers in the messages. Moreover, rate limiter 100 may selectively set an error value when a rate of certain symbols or values in the input values exceeds a predefined threshold value. In particular, when the symbols or values exceed a ratio of a predefined number of times x in a predefined time interval y (which specifies the rate r equal to x occurrences in time interval y, and which may be received on one or more command nodes 108), rate limiter 100 may selectively set the error value on output node 118-2 to report the violation. As described further below with reference to FIG. 10, the error value may be used to perform a remedial action.

Figure 2:
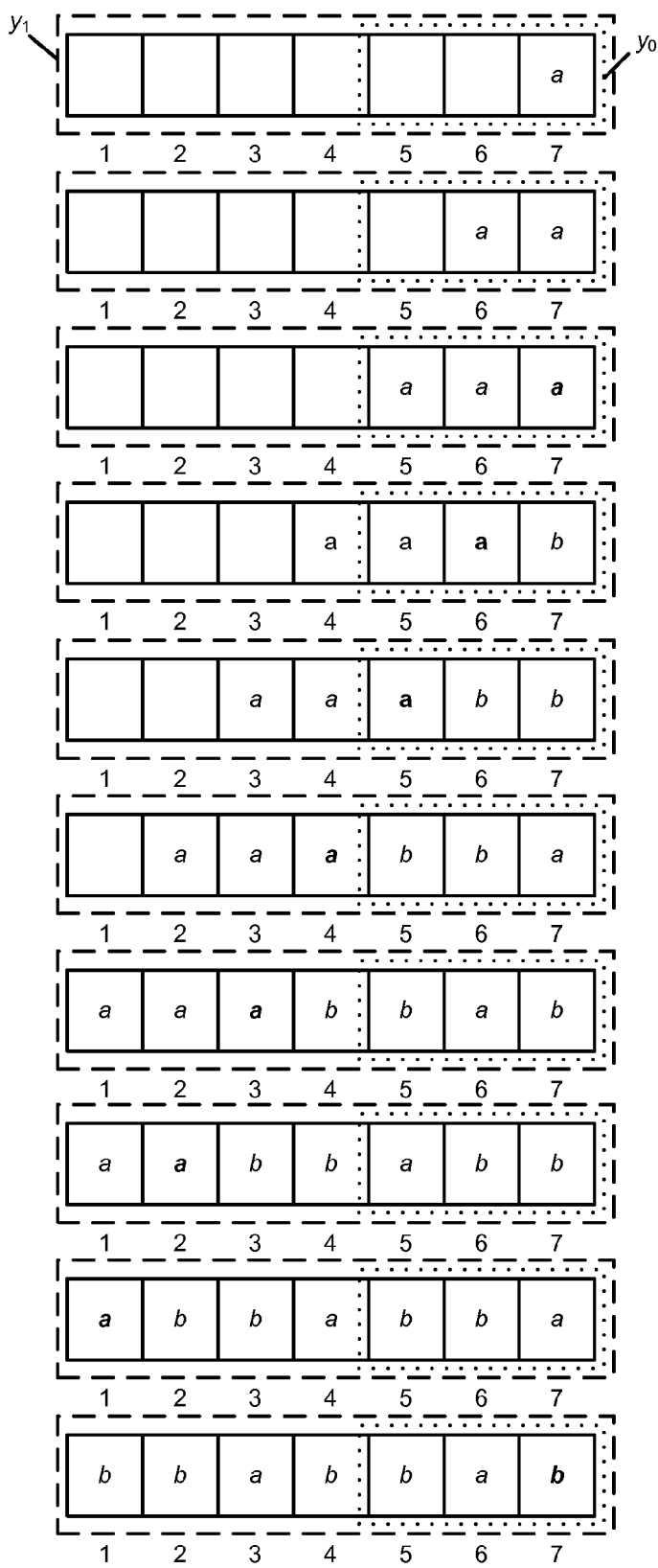
FIG. 2 is a drawing illustrating operation of the rate limiter of FIG. 1 in accordance with an embodiment of the present disclosure.

This is illustrated in FIG. 2, which presents a drawing illustrating operation of rate limiter 100 (FIG. 1). In this example, the rate limiter looks at ten clock cycles. In each clock cycle, either value a or value b occurs. (Note that the possible case where no value occurs in a clock cycle is not considered.) Two rates $r_0$ equal to $x_0$ occurrences in time interval $y_0$ or two occurrences in a time interval of three and $r_1$ equal to $x_1$ occurrences in time interval $y_1$ or four occurrences in a time interval of seven are checked. For each clock cycle, the rate windows and values to be considered are shown. In addition, as shown in Table 1, internal counters aggregate counter values during operation of rate limiter 100 (FIG. 1). These counter values are used to determine when a rate is exceeded, as well as the corresponding violation flags $vio_0$ and $vio_1$ (which are examples of error values). For each rate, counts are kept for the number of occurrences of the values for each rate. In particular, $cnt_{a,0}$ and $cnt_{b,0}$ count the number of occurrences of a and b, respectively, during time interval $y_0$. Furthermore, $cnt_{a,1}$ and $cnt_{b,0}$ count the number of occurrences of a and b, respectively, during interval $y_1$. In this example, if inserting a new value would exceed the rate $r_0$ or $r_1$ (i.e., $cnt_{a,0}$ or $cnt_{b,0}$ would be greater than two/$cnt_{a,1}$ or $cnt_{b,1}$ would be greater than four), the new value will not be inserted and $vio_0$ ($vio_1$, respectively) will be set to 1. In cycle 3, value a is received. $Cnt_{a,0}$ is equal to 2 and $cnt_{a,1}$ is equal to 2, i.e., two values a occurred in $y_0$ and two values a occurred in $y_1$. If a was inserted, $cnt_{a,0}$ would be equal to 3 and $cnt_{a,1}$ would be equal to 3. That would be a violation of $r_0$, thus the value will be dropped and $vio_0$ will be set to 1. It is, however, not a violation of $r_1$, so $vio_1$ is set to 0. The counter values will not change. In cycle 10, value b is received. $Cnt_{b,0}$ is equal to 2 and $cnt_{b,1}$ is equal to 4, i.e., two values b occurred in $y_0$ and four values b occurred in $y_1$. If b was inserted, $cnt_{b,0}$ would still be equal to 2 (because another value b will be removed from the window $y_0$) and $cnt_{b,1}$ would be equal to 5. That would be a violation of $r_1$, thus the value will be dropped and $vio_1$ will be set to 1. It is, however, not a violation of $r_0$, so $vio_0$ is set to 0. $Cnt_{b,0}$ will be equal to 1 and $cnt_{b,1}$ will still be equal to 4.

TABLE 1

| Cycle | Value to Insert | $cnt_{a,0}$ | $cnt_{b,0}$ | $cnt_{a,0}$ | $cnt_{b,1}$ | $vio_0$ | $vio_1$ | Value Dropped |
|---|---|---|---|---|---|---|---|---|
| 1 | a | 1 | 0 | 1 | 0 | 0 | 0 | No |
| 2 | a | 2 | 0 | 2 | 0 | 0 | 0 | No |
| 3 | a | 2 | 0 | 2 | 0 | 1 | 0 | Yes |
| 4 | b | 1 | 1 | 2 | 1 | 0 | 0 | No |
| 5 | b | 0 | 2 | 2 | 2 | 0 | 0 | No |
| 6 | a | 1 | 2 | 3 | 2 | 0 | 0 | No |
| 7 | b | 1 | 2 | 3 | 3 | 0 | 0 | No |
| 8 | b | 1 | 2 | 2 | 4 | 0 | 0 | No |
| 9 | a | 1 | 2 | 2 | 4 | 0 | 0 | No |
| 10 | b | 1 | 1 | 2 | 4 | 0 | 1 | Yes |

Referring back to FIG. 1, in order to implement this functionality, rate limiter 100 includes: a history memory 112, coupled to input node 110, which stores the input values during a time window defined by a current time and a predefined time interval; a counter memory 114, coupled to input node 110 and history memory 112, which aggregates counter values for different values of the input values during the time window; and control logic 116 coupled to counter memory 114. This control logic may: compare a counter value to the predefined threshold value; and selectively set the error value (such as one of the violation flags) based on the comparison. For example, the error value may be provided on output node 118-1 when the counter value exceeds the predefined threshold value.

When the error value is set, note that a most-recent instance of a value of the input value corresponding to the counter value may be excluded from history memory 112. Alternatively, when the error value is set, a most-recent instance of a value of the input value corresponding to the counter value may be stored in history memory 112.

Figure 3:
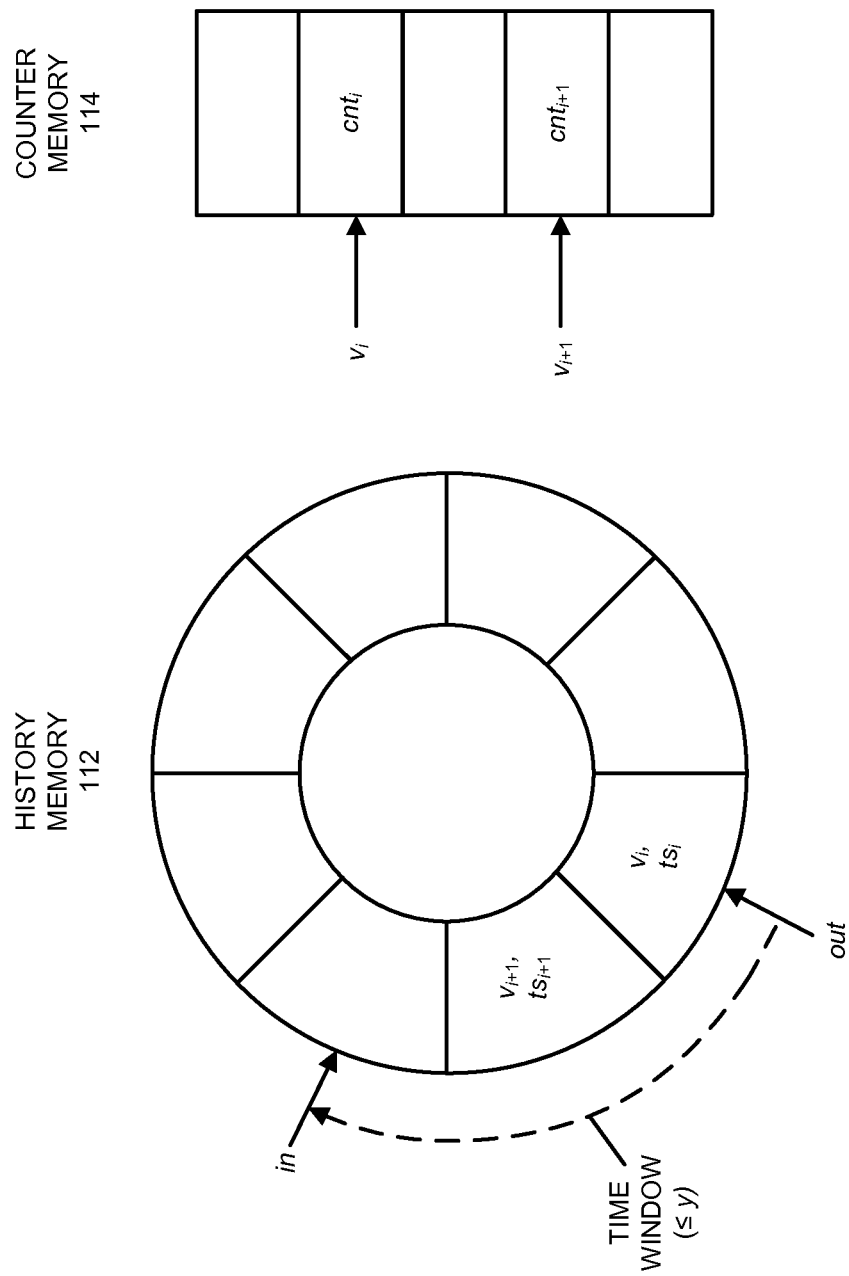
FIG. 3 is a drawing illustrating operation of a single-rate rate limiter in accordance with an embodiment of the present disclosure.

Operation of history memory 112 and counter memory 114 is illustrated in FIG. 3, which presents a drawing illustrating operation of a single-rate rate limiter. In particular, history memory 112 may be used to keep track of the values v that have been input to the rate limiter during the time window T-y, where T is the current time and y the time interval. In this example, history memory 112 is organized as a ring buffer. An in-pointer may point to the storage element at the head of the ring buffer that will be filled with the v that is received next, and the out-pointer may point to another storage element at the tail of the ring buffer that is removed next (after its associated timestamp moves out of the time window). When v is inserted, it may be accompanied by a timestamp ts that is set to the current time T. This timestamp ts may be stored in the ring buffer. Note that the value v stored in the tail storage element may be removed once its associated ts moves out of the time window, i.e., when ts is less than T-y. For example, the value and the associated timestamp ts stored in the tail storage element may be removed from history memory 112 by incrementing the out-pointer.

Counter memory 114 may store a counter cnt for each value v. For example, counter memory 114 may be organized as array elements that uses value v as the array index. (Thus, there may be different array elements in counter memory 114 for different values v.) The counter value cnt may be incremented when value v is inserted into history memory 112 and it may be decremented when value v is removed from history memory 112. The number of entries in history memory 112 may be determined as follows. The maximum number of storage elements n in history memory 112 may be given by the time interval y divided by the minimum inter-arrival time d of the values v. For example, if y equals 100 ms and d equals 100 ns, then n equals $10^6$ entries have to be provided. This assumes that values v are inserted at a sustained rate 1/d. (Alternatively, the maximum history size may be derived from the rate and the number of different values. In particular, in this example, if there are 1000 distinct values and the rate is x/y or 100/100 ms, then the maximum number of valid messages may be 1000·100.) If the average rate over time interval y is less than 1/d, the number n can be reduced accordingly. Note that the number of entries in counter memory 114 may be $2^b$, where b is the number of bits needed to represent the binary value v=0 . . . $2^b-1$, and the size of an entry cnt in counter memory 114 may be n.

Furthermore, note that the precision of the timestamp ts may not have to be better than d. It is assumed that the rate at which values v are inserted and removed from history memory 112 is greater than or equal to the arrival rate 1/d. The precision of the ts can be worse than d if the precision with which the rate is enforced can be relaxed.

Table 2 provides pseudocode for operation of a single-rate rate limiter (RL). Function Init-RL initializes x and y with the maximum number of occurrences X and the time interval Y, respectively. Function Check-RL first checks that the rate in the counter memory (CM) is not exceeded. If the rate is not exceeded, vio is set to FALSE, and v together with the current time T is inserted into the history memory HM and the incremented counter value is stored in CM. If the rate is exceeded, vio is set to TRUE. Different strategies can be applied to how v contributes to the counter values when vio is set. For example, either v is dropped, i.e., no modifications to the HM or to the CM are made. Alternatively, v is not dropped and the HM and the CM are modified as described before when the rate is not exceeded.

TABLE 2

```
function Init_RL (X, Y);
begin
    x = X;
    y = Y;
end
function Check_RL (v, vio);
begin
    vio = (CM[v].cnt + 1) > x;
    if not vio then
    begin
        HM[in] = {v,T};
        in = in + 1;
        CM[v].cnt = CM[v].cnt + 1;
    end
end
loop
begin
    if HM[out].ts < T-y then
    begin
        CM[HM[out].v].cnt = CM[HM[out].v].cnt - 1;
        out = out + 1;
    end
end
```

An infinite loop may periodically check whether the last storage element of history memory 112 has expired, i.e., whether its timestamp has moved outside the time window, in which case the storage element has to be removed. Removing the storage element may be accomplished by simply incrementing the out-pointer. Simultaneously, the corresponding counter in counter memory 114 may be decremented. The loop may be executed with a time period equal to or less than the minimum time between value arrivals. Alternatively, the loop may be executed with a time period equal to or less than the inverse of the maximum value arrival rate.

Figure 4:
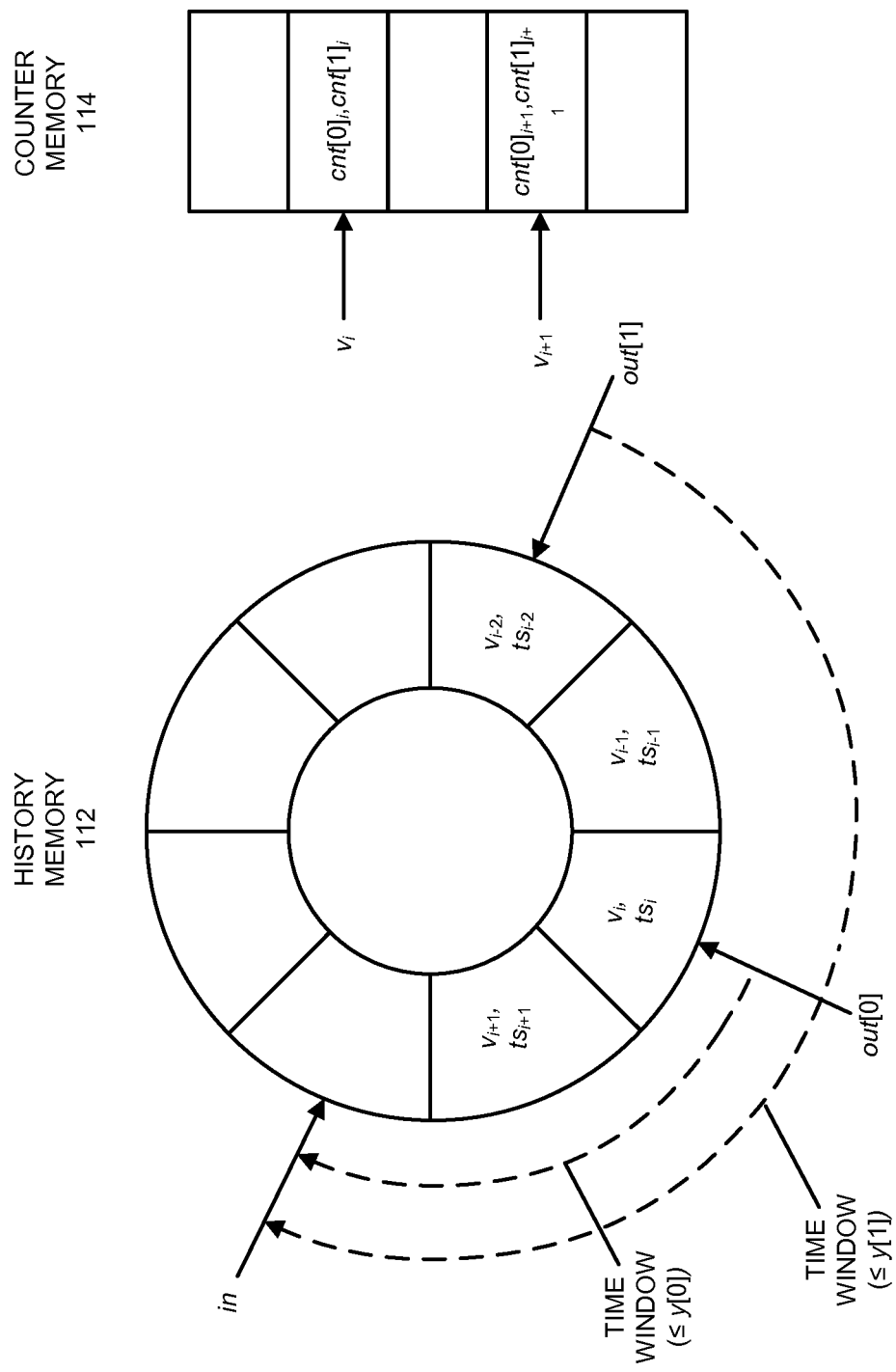
FIG. 4 is a drawing illustrating operation of a multiple-rate rate limiter in accordance with an embodiment of the present disclosure.

In some embodiments, the rate limiter supports multiple rates. This is shown in FIG. 4, which presents a drawing illustrating operation of a multiple-rate rate limiter. In particular, FIG. 4 shows how support for two rates x[0]/y[0] and x[1]/y[1] are provided in history memory 112 and counter memory 114. An entry in counter memory 114 now contains two counter values cnt[0] and cnt[1], and history memory 112 stores the history for two time intervals. The corresponding queues may be implemented with one queue that has one in-pointer and two out-pointers, out[0] and out[1]. Table 3 provides pseudocode for operation of a multi-rate rate limiter supporting R rates. When inserting and removing values from history memory 112, all the rates may now have to be considered. Moreover, when a new value v is obtained, each counter value cnt[i], for i equal to 0 to R−1 is stored in counter memory 114. An entry indexed by v may have to be compared with the respective x[i] to determine whether the rate was exceeded (and whether the corresponding vio[i] bit needs to be set). If no rate was exceeded, v may be inserted into history memory 112 and the corresponding counter values may be incremented. In order to determine whether an entry has moved out of a time window, the corresponding history memory 112 entry pointed to by the out-pointer out[i], for i equal to 0 to R−1 is examined. If an entry has to be removed, the corresponding out-pointer may be incremented.

TABLE 3

```
function Init_RL (X, Y);
begin
    for i = 0 to R - 1
    begin
        x[i] = X[i];
        y[i] = Y[i];
    end
end
function Check_RL (v, vio);
begin
    novio = TRUE;
    for i = 0 to R - 1
    begin
        vio[i] = (CM[v].cnt[i] + 1) > x[i];
        novio = novio and not vio[i];
    end
    if novio then
    begin
        for i = 0 to R - 1
        begin
            CM[v].cnt[i] = CM[v].cnt[i] + 1;
        end
        HM[in] = {v,T};
        in = in + 1;
    end
end
loop
begin
    for i = 0 to R - 1 do
    begin
        if HM[out[i ]].ts < T−y[i] then
        begin
            idx = HM[out [i]].v
            CM[idx].cnt[i] = CM[idx].cnt[i] − 1;
            out[i] = out[i] + 1;
        end
    end
end
```

In embodiments where the rate limiter supports multiple rates, one or more constraints may be enforced. In particular, because the rate limiter limits the rate of outgoing messages, then, with a rate r, if values are received at a rate greater than r, some of the incoming messages may be dropped so that the rate of the outgoing messages equals r. In order to support multiple rates (such as $r_0 = x_0/t_0$ and $r_1 = x_1/t_1$), this implies: $t_0 \le t_1$, $x_0 \le x_1$ and $x_0/t_0 \ge x_1/t_1$. The first constraint can be ensured, without loss of generality, by sorting the rates. Moreover, for the second constraint, note that, if $x_0$ was greater than $x_1$, then an incoming value would always trigger $r_1$ and never $r_0$. This is because, with $t_0 \le t_1$ and $x_0 > x_1$, $r_1$ allows for fewer elements in more time and, therefore, $r_0$ does not make sense. Similarly, for the third constraint, note that, if $x_0/t_0$ was less than $x_1/t_1$ and $t_0 \le t_1$, then $r_1$ could never be exceeded because $r_0$ already enforces a lower average message rate on shorter time intervals. Thus, $r_1$ would not be needed.

Figure 5:
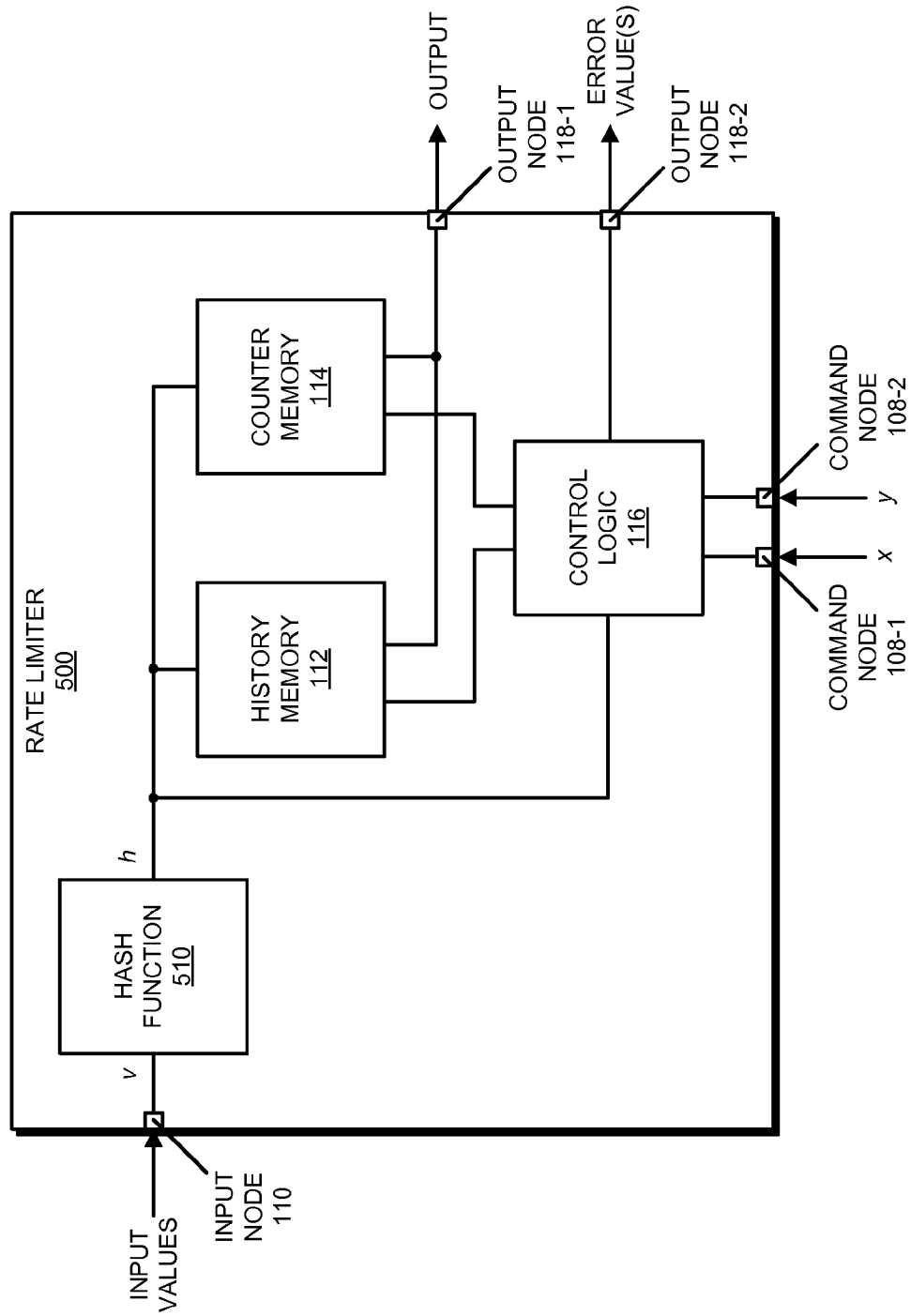
FIG. 5 is a block diagram illustrating a rate limiter in accordance with an embodiment of the present disclosure.

In some embodiments, if the values v are sparse, the input values are hashed using a hash function prior to further processing by the rate limiter. This is shown in FIG. 5, which presents a block diagram illustrating a rate limiter 500 with a hash function 510. In particular, hash function 510 may be a minimum perfect hash function (MPHF) as described in U.S. patent application Ser. No. 14/010,183, entitled "Systems and Methods for Implementing Dynamically Configurable Perfect Hash Tables" by Nils Gura, Guy L. Steele Jr., and David R. Chase, filed on Aug. 26, 2013, the contents of which are herein incorporated by reference. For example, the MPHF may hash input values without collisions and without having an unused state. Moreover, the MPHF can be used to save space in both history memory 112 (e.g., by making the entry smaller) and counter memory 114 (e.g., by reducing the number of entries). As shown in FIG. 5, the MPHF may map a sparse value v to a hash value h that is used as the index for rate limiter 500. Note that the values v input to the MPHF may need to be finite and known ahead of time so that the hash function tables in the MPHF can be computed before rate limiter 500 is initialized.

Figure 6:
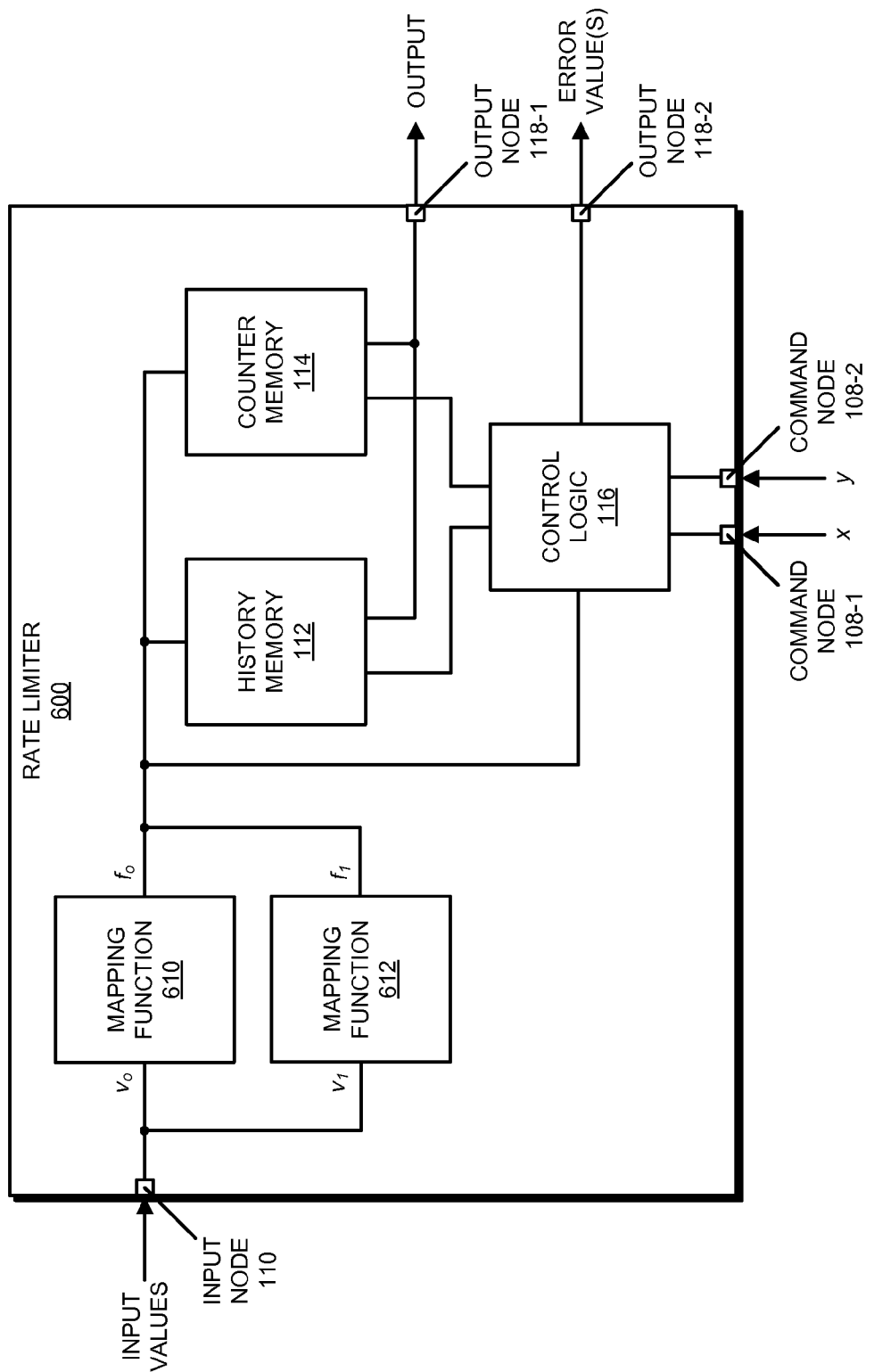
FIG. 6 is a block diagram illustrating a rate limiter in accordance with an embodiment of the present disclosure.

In some implementations, more than one mapping function is used to obtain the input value for the rate limiter. This is shown in FIG. 6, which presents a block diagram illustrating a rate limiter 600 with mapping functions 610 and 612. In general, mapping functions 610 and 612 may be different. For example, mapping function 610 may implement a hash function (such as a MPFH), while mapping function 612 may implement a lookup table. The inputs to mapping functions 610 and 612 are $v_0$ and $v_1$, and the corresponding outputs of mapping functions 610 and 612 are $f_0$ and $f_1$, respectively. As shown in FIG. 6, the concatenation of $f_0$ and $f_1$ is then used as the input value for rate limiter 600.

In some embodiments, control logic 116 in rate limiter 500 (FIG. 5) implements hash function 510 and/or control logic 116 in rate limiter 600 implements mapping functions 610 and 612. The control logic may be coupled to history memory 112. Moreover, control logic 116 may apply a predefined hash function or mapping function to the input values prior to storing the hashed or mapped input values in history memory 112. Furthermore, counter memory 114 may aggregate the hashed or mapped input values in the counter values.

Referring back to FIG. 1, in some embodiments rate limiter 100 checks for additional error conditions. For example, before a new value is inserted into history memory 112, control logic 116 may check that history memory 112 does not overflow. Additionally, before a counter in the counter memory 114 is incremented, control logic 116 may be checked to confirm that it does not overflow. If such an error condition is detected, control logic 116 may provide or assert one or more error flags to indicate such error conditions.

Figure 7:
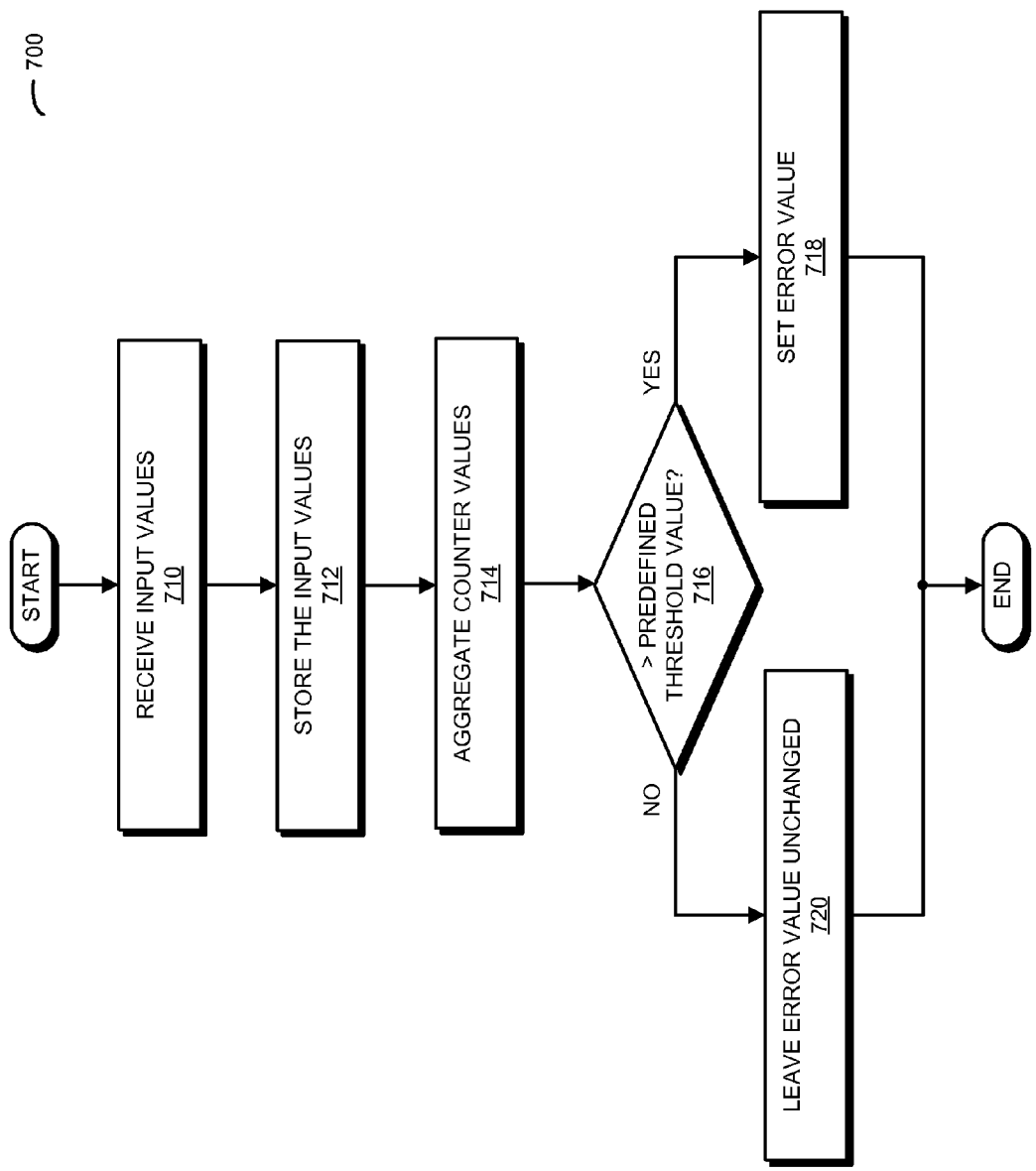
FIG. 7 is a flow diagram illustrating a method for selectively setting an error value in accordance with an embodiment of the present disclosure.

We now describe embodiments of the method. FIG. 7 presents a method 700 for selectively setting an error value that may be performed by a rate limiter, such as one of the embodiments of the rate limiter described in FIGS. 1, 5, and/or 6. During operation, the rate limiter receives input values (operation 710) at an input node. Then, using a history memory in the rate limiter, the rate limiter stores the input values (operation 712) during a time window defined by a current time and a predefined time interval. Moreover, using a counter memory in the rate limiter, the rate limiter aggregates counter values (operation 714) for different values of the input values during the time window. Next, using control logic in the rate limiter, the rate limiter compares a counter value to a predefined threshold value. In particular, the control logic may determine if the counter value exceeds the predefined threshold value (operation 716). Furthermore, using the control logic in the rate limiter, the rate limiter selectively sets the error value based on the comparison. For example, if the counter value exceeds the predefined threshold value (operation 716), the control logic may set the error value (operation 718). Otherwise (operation 716), the control logic may leave the error value unchanged (operation 720) from a default value.

In some embodiments of method 700, there are additional or fewer operations. Moreover, the order of the operations may be changed and/or two or more operations may be combined into a single operation.

Figure 8:
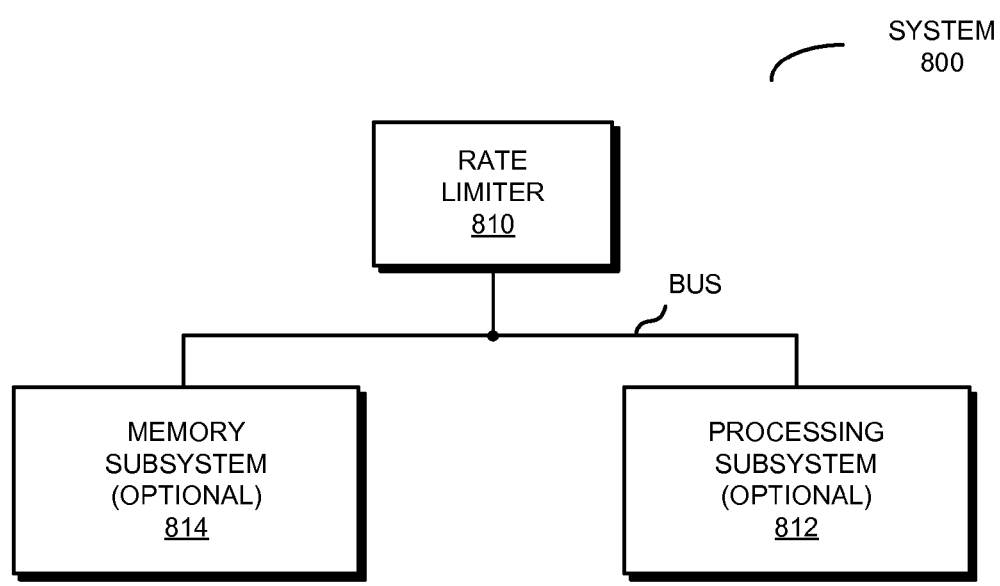
FIG. 8 is a block diagram illustrating a system that includes a rate limiter in accordance with an embodiment of the present disclosure.

We now describe embodiments of the system. FIG. 8 presents a block diagram of a system 800 that includes rate limiter 810, which may be one of the preceding embodiments of the rate limiter (such as rate limiter 100 in FIG. 1). Furthermore, system 800 may include one or more program modules or sets of instructions stored in an optional memory subsystem 814 (such as DRAM, another type of volatile or non-volatile computer-readable memory, and more generally a memory), which may be executed by an optional processing subsystem 812 (which may include one or more processors). Note that the one or more computer programs may constitute a computer-program mechanism. Furthermore, instructions in the various modules in optional memory subsystem 814 may be implemented in: a high-level procedural language, an object-oriented programming language, and/or in an assembly or machine language. Note that the programming language may be compiled or interpreted, e.g., configurable or configured, to be executed by optional processing subsystem 812.

More generally, embodiments of the rate limiter may be used in a variety of applications, including communications, high-performance computing, etc. As a consequence, the system may include: VLSI circuits, communication systems, storage area networks, data centers, networks (such as local area networks), and/or computer systems (such as multiple-core processor computer systems). Note that system 800 may include, but is not limited to: a server (such as a multi-socket, multi-rack server), a message gateway, a laptop computer, a communication device or system, a tablet computer, a personal computer, a work station, a mainframe computer, a blade, an enterprise computer, a data center, a portable-computing device, a supercomputer, a data center, a network-attached-storage (NAS) system, a storage-area-network (SAN) system, and/or another electronic computing device. Moreover, note that a given computer system may be at one location or may be distributed over multiple, geographically dispersed locations.

Figure 9:
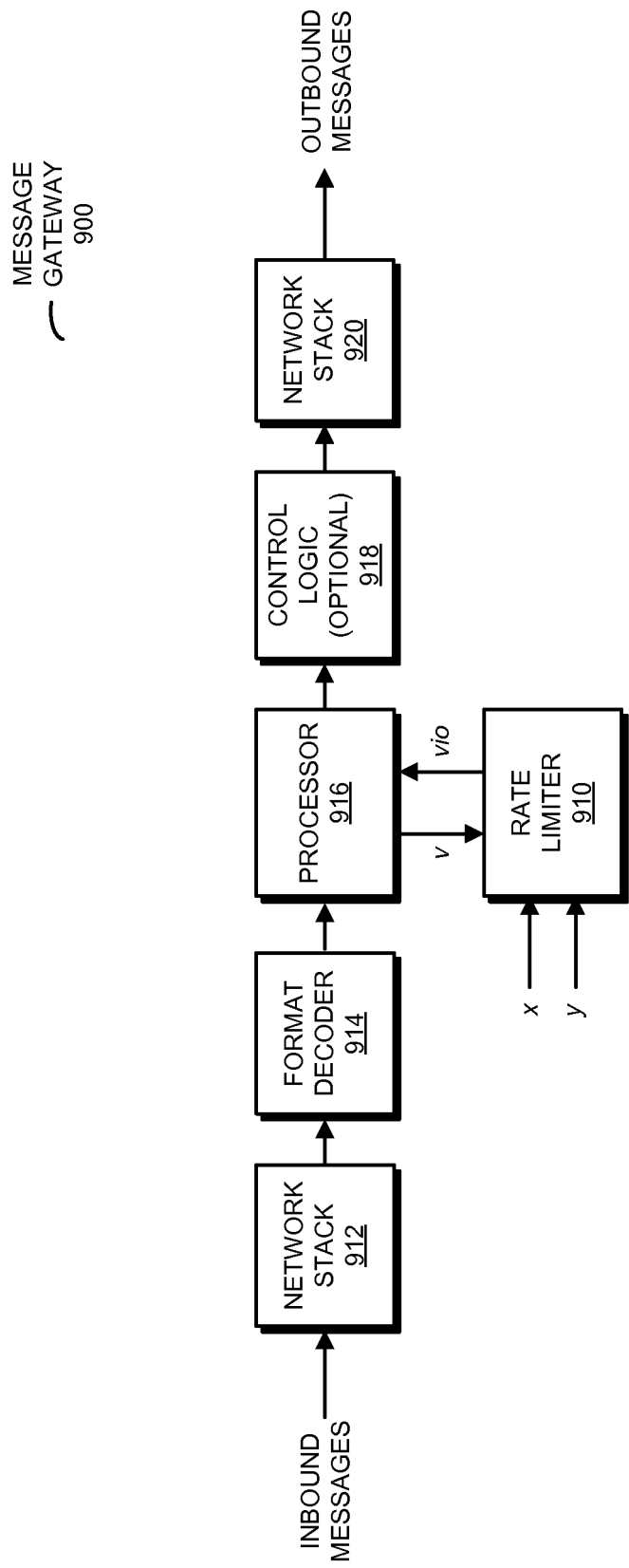
FIG. 9 is a block diagram illustrating a message gateway that includes a rate limiter in accordance with an embodiment of the present disclosure.

In an exemplary embodiment, the rate limiter is used in a message gateway. This is shown in FIG. 9, which presents a block diagram illustrating a message gateway 900 that includes a rate limiter 910. In particular, message gateway 900 may connect stock brokers or dealers with a stock exchange. Message gateway 900 may perform compliance tests on the messages received from the stock broker via a network, and may forward the messages that pass the tests to the stock exchange via another or the same network. Rate limiter 910 may be used to implement one or more of these tests that guarantees that the rate of forwarding so-called 'enter order' messages does not exceed a maximum rate. For example, there may be different rates in different time intervals for a given stock symbol, such as 100 messages in 1 s and 150 messages in 2 s. Note that the orders may be tracked per stock ticker symbol (which specifies a corresponding input value) and order type (such as buy, sell, sell short).

As shown in FIG. 9, messages are received by network stack 912 and forwarded to format decoder 914, which decodes messages based on a communication protocol. There, the message fields of interest are extracted and passed on to processor 916. If the message passes the compliance tests, it is forwarded to network stack 920. In some embodiments, optional control logic 918 uses the output from rate limiter 910 to, at least in part, determine subsequent remedial action. For example, if the error value is provided, optional control logic 918 may drop a message that included the input value. Alternatively, of the error value is not provided, optional control logic 918 may store the message in a log, and may forward the message to its destination.

Processor 916 uses rate limiter 910 as a co-processor. A hash function may be performed on the stock symbol (which may be represented as an 8-byte character string) extracted from the 'enter order' message. The resulting hash value together with the order type (which may be represented as two bits) may be used as the value v that is passed on to rate limiter 910. Moreover, the hash function may be selected such that it is guaranteed to calculate a unique value for each stock symbol. Note that rate limiter 910 returns vio to indicate whether a rate was exceeded or not. Furthermore, note that the rate parameters x and y may be provided by control registers that are initialized when message gateway 900 is reset.

The preceding embodiments may include fewer components or additional components. Although these embodiments are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed.

Furthermore, functionality in these circuits, components and devices is implemented in hardware and/or in software as is known in the art. For example, some or all of the functionality of these embodiments may be implemented in one or more: application-specific integrated circuits (ASICs), field-programmable gate arrays (FPGAs), and/or one or more digital signal processors (DSPs). In particular, a hardware implementation of the rate limiter may allow the rate limiter to scale to thousands or millions of input values with latency on the order of microseconds. Additionally, note that circuits in these embodiments may be implemented using PMOS and/or NMOS, and signals may include digital signals that have approximately discrete values and/or analog signals that have continuous values. Note that components and circuits may be single-ended or differential, and power supplies may be unipolar or bipolar.

In the preceding embodiments, some components are shown directly connected to one another, while others are shown connected via intermediate components. In each instance the method of interconnection, or 'coupling,' establishes some desired electrical communication between two or more circuit nodes, or terminals. Such coupling may often be accomplished using a number of circuit configurations, as will be understood by those of skill in the art (for example, AC coupling and/or DC coupling may be used).

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDSII Stream Format (GDSII) or Electronic Design Interchange Format (EDIF). Those of skill in the art of integrated circuit design can develop such data structures from schematics of the type detailed above and the corresponding descriptions and encode the data structures in a computer-readable medium. Those of skill in the art of integrated circuit fabrication can use such encoded data to fabricate integrated circuits comprising one or more of the circuits described herein.

While the preceding embodiments illustrated the use of the rate limiter in a message gateway for messages associated with stock transactions, in other embodiments the rate limiter may be used in other applications. For example, the rate limiter may be used to limit the rate of network traffic from a site, a port or a website. Alternatively, the rate limiter may be used in a data center or for event-driven processing.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A rate limiter, comprising:
   an input node configured to receive input values;
   a history memory, coupled to the input node, configured to store the input values during a time window defined by a current time and a predefined time interval;
   a counter memory, coupled to the input node and the history memory, configured to aggregate counter values for different values of the input values during the time window; and
   control logic, coupled to the counter memory, configured to: compare a counter value to predefined threshold value; and selectively set an error value based on the comparison;
   wherein the history memory includes a ring buffer;
   wherein an in-pointer point to a storage element at a head of the ring buffer where a next-received input value is stored with an associated timestamp; and
   wherein an out-pointer point to another storage element at a tail of the ring buffer where another input value and another associated timestamp are stored and are removed when the other timestamp moves out of the time window.

2. The rate limiter of claim 1, wherein the counter memory includes array elements associated with the different values; and wherein an array element for a given value is incremented when the next received input value having the given value is stored in the history memory, and is decremented when the other input value having the given value is removed from the history memory.

3. The rate limiter of claim 1, wherein, when the other timestamp moves out of the time window, the other input value and the other timestamp are removed from the history memory by incrementing the out-pointer.

4. The rate limiter of claim 1, wherein the error value is provided when the counter value exceeds the predefined threshold value.

5. The rate limiter of claim 1, wherein, when the error value is set, a most-recent instance of a value of the input value corresponding to the counter value is excluded from the history memory.

6. The rate limiter of claim 1, wherein, when the error value is set, a most-recent instance of a value of the input value corresponding to the counter value is stored in the history memory.

7. The rate limiter of claim 1, wherein the control logic is further configured to:
   compare a second counter value to a second predefined threshold value; and
   selectively set a second error value based on the comparison of the second counter value and the second predefined threshold value.

8. The rate limiter of claim 7, wherein the second counter value is aggregated during a second time window defined by the current time and a second predefined time interval.

9. The rate limiter of claim 1, wherein the history memory includes a ring buffer;
   wherein an in-pointer point to a storage element at a head of the ring buffer where a next-received input value is stored with an associated timestamp;
   wherein an out-pointer point to a second storage element in the ring buffer where another input value and another associated timestamp are stored and are removed when the other timestamp moves out of the time window; and
   wherein a second out-pointer point to a third storage element in the ring buffer where the other input value and the other associated timestamp are stored and are removed when the other timestamp moves out of a second time window, which is defined by the current time and a second predefined time interval.

10. The rate limiter of claim 9, wherein the counter memory includes array elements associated with the different values; and
    wherein an array element for a given value is incremented when the next received input value having the given value is stored in the history memory and is decremented when the other input value having the given value is removed from the history memory.

11. The rate limiter of claim 9, wherein, when the other timestamp moves out of the time window, the other input value and the other timestamp are removed from the history memory by incrementing the out-pointer; and
    wherein, when the other timestamp moves out of the other time window, the other input value and the other timestamp are removed from the history memory by incrementing the second out-pointer.

12. The rate limiter of claim 1, wherein the control logic is coupled to the history memory;
    wherein the control logic is configured to apply a predefined hash function to the input values prior to storing hashed input values in the history memory; and
    wherein the counter memory aggregates the hashed input values in the counter values.

13. The rate limiter of claim 12, wherein the control logic is further configured to apply a mapping function to the input values prior to storing mapping input values in the history memory; and wherein the counter memory aggregates the combination of the hashed input values and the mapping input values in the counter values.

14. A system, comprising:
a processor; and
a rate limiter coupled to the processor, wherein the rate limiter includes: an input node configured to receive input values;
a history memory, coupled to the input node, configured to store the input values during a time window defined by a current time and a predefined time interval;
a counter memory, coupled to the input node and the history memory, configured to aggregate counter values for different values of the input values during the time window; and
control logic, coupled to the counter memory, configured to: compare a counter value to a predefined threshold value; and selectively set an error value based on the comparison;
wherein the history memory includes a ring buffer;
wherein an in-pointer point to a storage element at a head of the ring buffer where a next-received input value is stored with an associated timestamp; and
wherein an out-pointer point to another storage element at a tail of the ring buffer where another input value and another associated timestamp are stored and are removed when the other timestamp moves out of the time window.

15. The system of claim 14, wherein the counter memory includes array elements associated with the different values; and wherein an array element for a given value is incremented when the next received input value having the given value is stored in the history memory, and is decremented when the other input value is removed from the history memory.

16. The system of claim 14, wherein, when the other timestamp moves out of the time window, the other input value and the other timestamp are removed from the history memory by incrementing the out-pointer.

17. The system of claim 14, wherein the control logic is further configured to:
compare a second counter value to a second predefined threshold value; and
selectively set a second error value based on the comparison of the second counter value and the second predefined threshold value; and
wherein the second counter value is aggregated during a second time window defined by the current time and a second predefined time interval.

18. A rate-limiter-implemented method for selectively setting an error value, wherein the method comprises:
receiving input values at an input node;
using a history memory in the rate limiter, storing the input values during a time window defined by a current time and a predefined time interval;
using a counter memory in the rate limiter, aggregating counter values for different values of the input values during the time window;
using control logic in the rate limiter, comparing a counter value to a predefined threshold value; and
using the control logic in the rate limiter, selectively setting the error value based on the comparison;
wherein the history memory includes a ring buffer;
wherein an in-pointer point to a storage element at a head of the ring buffer where a next-received input value is stored with an associated timestamp; and
wherein an out-pointer point to another storage element at a tail of the ring buffer where another input value and another associated timestamp are stored and are removed when the other timestamp moves out of the time window.

* * * * *

UNITED STATES PATENT AND TRADEMARK OFFICE
CERTIFICATE OF CORRECTION

PATENT NO. : 9,742,679 B2
APPLICATION NO. : 14/710220
DATED : August 22, 2017
INVENTOR(S) : Eberle et al.

Page 1 of 1

It is certified that error appears in the above-identified patent and that said Letters Patent is hereby corrected as shown below:

In the Claims

In Column 11, Line 49, delete "value to" and insert -- value to a --, therefor.

Signed and Sealed this
Twenty-ninth Day of May, 2018

Andrei Iancu
*Director of the United States Patent and Trademark Office*